US012747990B2

(12) United States Patent
Lee et al.

(10) Patent No.: US 12,747,990 B2
(45) Date of Patent: Sep. 29, 2026

(54) SENSOR DEVICE

(71) Applicant: LS ELECTRIC CO., LTD., Anyang-si (KR)

(72) Inventors: Hyun Wook Lee, Anyang-si (KR); Min Kyu Seo, Anyang-si (KR); Ki Hyeon Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 321 days.

(21) Appl. No.: 18/682,385

(22) PCT Filed: Sep. 28, 2022

(86) PCT No.: PCT/KR2022/014567
§ 371 (c)(1),
(2) Date: Feb. 8, 2024

(87) PCT Pub. No.: WO2023/128152
PCT Pub. Date: Jul. 6, 2023

(65) Prior Publication Data
US 2025/0130114 A1 Apr. 24, 2025

(30) Foreign Application Priority Data
Dec. 28, 2021 (KR) ........................ 10-2021-0189560

(51) Int. Cl.
*G01K 1/08* (2021.01)
*G01D 11/24* (2006.01)
(Continued)

(52) U.S. Cl.
CPC ............... *G01K 1/08* (2013.01); *G01D 11/24* (2013.01); *G01D 11/245* (2013.01); *G01D 11/30* (2013.01); *G01D 21/00* (2013.01); *G01D 21/02* (2013.01)

(58) Field of Classification Search
CPC ........ G01K 1/08; G01D 11/24; G01D 11/245; G01D 11/30; G01D 21/00
See application file for complete search history.

(56) References Cited

U.S. PATENT DOCUMENTS

2004/0028118 A1* 2/2004 Sidoni .................... G01K 1/143
374/E1.019
2016/0131306 A1* 5/2016 Ishikawa .............. A61B 5/6895
473/516

(Continued)

FOREIGN PATENT DOCUMENTS

CN 204483921 U 7/2015
CN 106576401 A 4/2017

(Continued)

OTHER PUBLICATIONS

Extended European Search Report for related European Application No. 22916306.8; action dated Sep. 17, 2025; (4 pages).

(Continued)

*Primary Examiner* — Laura Martin Sweeney
*Assistant Examiner* — Philip L Cotey
(74) *Attorney, Agent, or Firm* — K&L Gates LLP

(57) ABSTRACT

A sensor device is disclosed. The sensor device according to an aspect of the present disclosure may comprise: a housing within which a space is formed; a sensor module which is movably coupled to the housing and is exposed at one end thereof to the outside and configured to sense information on the state of an external member; and an electrically conducting part which is accommodated in the space of the housing and is in electrical communication with the sensor module to receive the detected information transferred from the sensor module and supply power to the sensor module therethrough, wherein the sensor module includes: a body part which is exposed to the outside; and an elastic member (Continued)

which is coupled to the body part and presses the body part toward the external member.

14 Claims, 11 Drawing Sheets

(51) Int. Cl.

| | |
|---|---|
| ***G01D 11/30*** | (2006.01) |
| ***G01D 21/00*** | (2006.01) |
| ***G01D 21/02*** | (2006.01) |

(56) References Cited

U.S. PATENT DOCUMENTS

| | | | | |
|---|---|---|---|---|
| 2020/0196397 | A1* | 6/2020 | Hoare | F24C 15/105 |
| 2020/0333192 | A1* | 10/2020 | Takase | G01K 1/18 |
| 2024/0272008 | A1* | 8/2024 | Yoshito | F16F 1/12 |

FOREIGN PATENT DOCUMENTS

| | | | |
|---|---|---|---|
| CN | 107655613 | A | 2/2018 |
| GB | 2551111 | A | 12/2017 |
| JP | 2018197723 | A | 12/2018 |
| JP | 2019070516 | A | 5/2019 |
| KR | 101321169 | B1 | 10/2013 |
| KR | 20180010784 | A | 1/2018 |
| KR | 102191755 | B1 | 12/2020 |

OTHER PUBLICATIONS

International Search Report for related International Application No. PCT/KR2022/014567; action dated Jul. 6, 2023; (3 pages).
Written Opinion for related International Application No. PCT/KR2022/014567; action dated Jul. 6, 2023; (4 pages).
LS Electric Co., Ltd; "Gridsol Care—Smart MV Solution"; Product Catalog; Sep. 1, 2022; (36 pages).
LS Electric Co., Ltd; "Gridsol Care—Smart MV Solution"; Product Catalog; Jun. 1, 2021; (36 pages).
Office Action for related Chinese Application No. 202280050705.7; action dated May 1, 2026; (9 pages).

* cited by examiner

SENSOR DEVICE

CROSS-REFERENCE TO RELATED APPLICATIONS

This application is a National Stage of International Application No. PCT/KR2022/014567, filed on Sep. 28, 2022, which claims priority to and the benefit of Korean Patent Application No. 10-2021-0189560, filed on Dec. 28, 2021, the disclosures of which is incorporated herein by reference in its entirety.

FIELD

The present disclosure relates to a sensor device, and more specifically to a sensor device which is capable of improving contact pressure with an information acquisition target.

BACKGROUND

The circuit breaker refers to a device that is connected to conduct electricity with an external power source and a load, respectively, and allows or blocks an electrically conducting state between the power source and the load. When an abnormal current such as an overcurrent from an external power source flows into the circuit breaker, the circuit breaker performs a blocking operation (trip operation) to cut off the electrically conducting state between the external power supply and the load.

The circuit breaker includes various components. As the circuit breaker operates, the components operate, and heat is generated. In addition, even when an abnormal current is applied from an external power source, excessive heat may be generated in each component of the circuit breaker.

When the generated heat stays in the circuit breaker for more than a predetermined time, there is a risk that each component of the circuit breaker may be damaged. Therefore, circuit breakers are generally equipped with sensing devices for measuring internal or external temperatures.

In addition, for the normal operation of the circuit breaker, it is desirable to collect various types of information related to the circuit breaker itself and the surrounding environment, such as humidity, vibration and strength, in addition to temperature. The various collected information is transmitted to the administrator's terminal and can be utilized as a basis for the administrator to determine the operating state of the circuit breaker.

A sensor may be provided as a means for collecting various information as described above. The sensor includes a sensing unit for collecting various information. Particularly, in order to accurately detect information related to temperature, it is preferable that the sensing unit contact the member to be measured.

However, apart from cases where the surface of the member to be measured and the surface of the sensing unit are formed in similar shapes, when the surface of the member and the surface of the sensing unit have different shapes, it is difficult to form a contact state between the sensing unit and the member. In addition, even when the sensing unit and the member are in contact, it is difficult to stably maintain the contact state.

Korean Registered Patent No. 10-2191755 discloses a contact-type sliding temperature sensor. Specifically, a contact-type sliding temperature sensor including a bracket for providing an elastic force to a contact part contacting a member to be measured and a screw for adjusting the position of the contact surface is disclosed.

However, in the contact-type sliding temperature sensor disclosed in the related art document, a member for sensing and a member for transmitting detected information are provided separately and are disposed to be spaced apart from each other. In addition, since the contact part disclosed in the related art document is pressed by a bracket, it is difficult to actively correspond to the shape of the member to be measured.

That is, the related art document does not suggest a method for stably maintaining a contact state with a member to be measured while miniaturizing a temperature sensor.

Korean Registered Patent No. 10-1321169 discloses a temperature sensor. Specifically, a temperature sensor including a probe unit that can be inserted into a high-temperature region and a plurality of springs that bias the probe unit by applying an elastic force to the probe unit is disclosed.

However, it is premised that the temperature sensor disclosed in the related art document is inserted into a member to be measured to sense the temperature. That is, the above related art document does not suggest a method for maintaining a contact state when contacting the surface of a member to be measured and sensing the temperature.

Korean Registered Patent No. 10-2191755 (Dec. 16, 2020)
Korean Registered Patent No. 10-1321169 (Oct. 23 2013)

SUMMARY

The present disclosure has been devised to solve the above problems, and an object of the present disclosure is to provide a sensor device having a structure in which the contact state with a measurement object can be stably maintained.

Another object of the present disclosure is to provide a sensor device having a structure in which a member for measurement is not separated.

Still another object of the present disclosure is to provide a sensor device having a structure in which the reliability of measured information can be improved.

Still another object of the present disclosure is to provide a sensor device having a structure which is capable of miniaturization.

The problems of the present disclosure are not limited to the problems mentioned above, and other problems that are not mentioned will be clearly understood by those skilled in the art from the description below.

According to an aspect of the present disclosure, provided is a sensor device, including a housing within which a space is formed; a sensor module which is movably coupled to the housing and is exposed at one end thereof to the outside and configured to sense information on the state of an external member; and an electrically conducting part which is accommodated in the space of the housing and is in electrical communication with the sensor module to receive the detected information transferred from the sensor module and supply power to the sensor module therethrough, wherein the sensor module includes a body part which is exposed to the outside; and an elastic member which is coupled to the body part and presses the body part toward the external member.

In this case, the sensor device may be provided, wherein the body part includes a body outer periphery which forms an outer periphery thereof and is formed to extend in a direction toward the housing and a direction toward the external member; and a base which is located at one end facing the external member among the ends of the body outer periphery and has a cross-section with a greater diameter than the cross-section of the body outer periphery.

In addition, the sensor device may be provided, wherein inside the elastic member, an elastic hollow is formed into which the body outer periphery is inserted, and wherein the elastic member is formed to extend in the same direction as the body outer periphery, and one end in the extension direction elastically supports the base.

In this case, the sensor device may be provided, wherein the housing includes a lifting space which is formed to have a diameter greater than the outer diameter of the elastic member, extends in the extension direction around the body outer periphery, and has one end of the extension direction communicating with the outside; and a support through-hole which is formed to have a diameter greater than the outer diameter of the body outer periphery but smaller than the outer diameter of the elastic member, and is formed to extend in the extension direction of the body outer periphery such that one end of the extension direction communicates with the lifting space and the other end of the extension direction communicates with the space of the housing.

In addition, the sensor device may be provided, wherein the housing includes an elastic member support which surrounds the support through-hole radially from the outside and partially surrounds one end of the lifting space, wherein the other end of the extension direction of the elastic member elastically supports the elastic member support.

In this case, the sensor device may be provided, wherein the body part includes a body outer periphery which forms an outer periphery thereof and is formed to extend in a direction toward the housing and a direction toward the external member; a coupling groove which is located to be biased toward one end in the direction toward the housing among the ends of the extension direction of the body outer periphery, is formed to be recessed in the body outer periphery, and extends along the outer peripheral direction.

In addition, the sensor device may be provided, wherein the sensor module includes a fixed ring which is inserted into and coupled to the coupling groove and is configured to adjust a diameter thereof by being pressed in the radial direction, wherein the fixed ring is located in the space of the housing.

In this case, the sensor device may be provided, wherein the housing includes a support depression which is formed to be recessed on the inner surface in one direction facing the external member, into which the fixed ring is seated.

In addition, the sensor device may be provided, wherein the sensor module includes a sensing element which is accommodated in a body hollow formed inside the body part, detects the information, and conducts electricity with the electrically conducting part to transmit the detected information to the electrically conducting part.

In this case, the sensor device may be provided, wherein the body part is disposed such that one end thereof is in contact with the external member, and wherein the sensing element is configured to contact an inner surface of the body part and receive heat transferred from the external member to the body part.

In addition, the sensor device may be provided, wherein inside the body hollow, a fixing material for fixing the sensing element to the body part is accommodated, and wherein the fixing material is formed of a thermally conductive material.

In this case, the sensor device may be provided, wherein the fixing material is an epoxy material.

In addition, the sensor device may be provided, wherein the electrically conducting part includes a power supply unit which conducts electricity with the sensor module and supplies the power to the sensor module; and a printed circuit board (PCB) which conducts electricity with the power supply unit and the sensor module and receives the detected information.

In this case, the sensor device may be provided, wherein the power supply unit is provided with a battery that is capable of charging and discharging.

According to the above configuration, the sensor device according to an exemplary embodiment of the present disclosure can stably maintain a contact state with an object to be measured.

First of all, the sensor device includes a housing in which a space is formed therein. An electrically conducting part for supplying power for the operation of the sensor device is provided inside the housing. A sensor module for detecting information on an external member is coupled to the housing. The sensor module is coupled to the housing so as to be liftable, that is, in a retractable form.

A portion of the sensor module is exposed to the outside. The sensor module includes a sensing element for obtaining information in contact with the external member and a body part for accommodating the sensing element. One end of the body part is configured to come into contact with the external member.

The sensor module includes an elastic member which is coupled to the body part. An elastic hollow is formed inside the elastic member, and the body part is inserted and coupled thereto. The elastic member is formed to extend along a direction in which the body part extends. One end of the elastic member in the extension direction is in contact with the housing, and the other end is in contact with a base which is formed at the one end of the body.

That is, the elastic member is configured to elastically support the body part with respect to the housing. The elastic member presses the body part toward the outside of the housing, that is, toward the external member. In an exemplary embodiment, the sensor device may be coupled to the external member by a band member.

Accordingly, the sensor module receives a force applied in a direction toward the external member such that a contact pressure of the sensor module may be increased. Accordingly, it is possible to stably maintain a contact state between the sensor module and the external member.

In addition, according to the configuration described above, in the sensor device according to an exemplary embodiment of the present disclosure, a member for measurement may not be arbitrarily separated.

The sensor module is provided with a fixed ring. In addition, a coupling groove is formed to be recessed on the body outer periphery forming the outer periphery of the body part. The fixed ring is inserted into and coupled to the coupling groove to be retractable.

The coupling groove is located to be biased at one end accommodated inside the housing among the ends of the body part. The fixed ring which is inserted into and coupled to the coupling groove is also positioned to be biased toward one end accommodated inside the housing.

A support depression is formed to be recessed on one surface to which the sensor module is coupled among the inner surfaces of the housing. The fixed ring is accommodated and supported in the support depression. That is, the fixed ring is not arbitrarily separated from the support depression.

Therefore, the sensor module can only be moved out of the housing until the fixed ring contacts the support depression. Accordingly, the sensor module is not arbitrarily separated from the housing.

In addition, according to the above configuration, the sensor device according to an exemplary embodiment of the present disclosure can improve the reliability of measured information.

A sensing element is accommodated in a hollow body formed inside the body part. Any material for fixing the sensing element may be filled in the hollow body. In an exemplary embodiment, a material having high thermal conductivity, such as epoxy, may be filled in the body hollow so as to fix the sensing element to the body part.

The body part is in contact with the external member to receive heat. In this case, the body part is maintained in a contact state with the external member by the elastic member.

The transferred heat may be transferred to the sensing element through the material. In addition, the received heat may be transmitted to the sensing element in contact therewith through the inner peripheral surface of the body part surrounding the hollow body.

Therefore, heat loss can be minimized while heat is transferred from the external member to the sensing element. Accordingly, the reliability of measured information may be improved.

In addition, according to the above configuration, the sensor device according to an exemplary embodiment of the present disclosure can be miniaturized.

Various components constituting the sensor device are all accommodated in the housing. In particular, the sensor module is coupled to the housing in a retractable form such that the length of the sensor module exposed to the outside can be adjusted.

In an exemplary embodiment, the sensor device may be operated in a wireless format. That is, the power supply unit provided in the electrically conducting part is provided in the form of a battery that can be charged and discharged, and thus, the sensor device can be operated without a separate power supply connection.

Accordingly, since the sensor device is miniaturized, the information of various points can be detected regardless of the environment in which the external member is located.

The effects of the present disclosure are not limited to the above-described effects, and should be understood to include all effects that can be inferred from the detailed description of the present disclosure or the configuration of the disclosure described in the claims.

DETAILED DESCRIPTION

Figure 1:
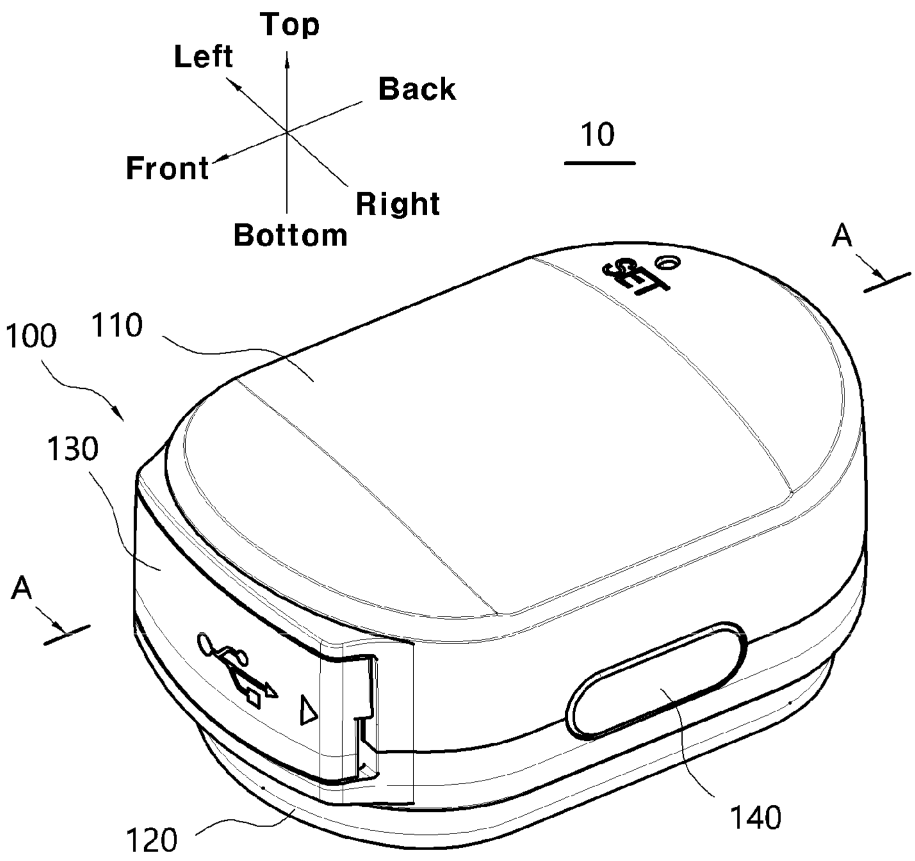
FIG. 1 is a perspective view illustrating a sensor device according to an exemplary embodiment of the present disclosure.
Figure 2:
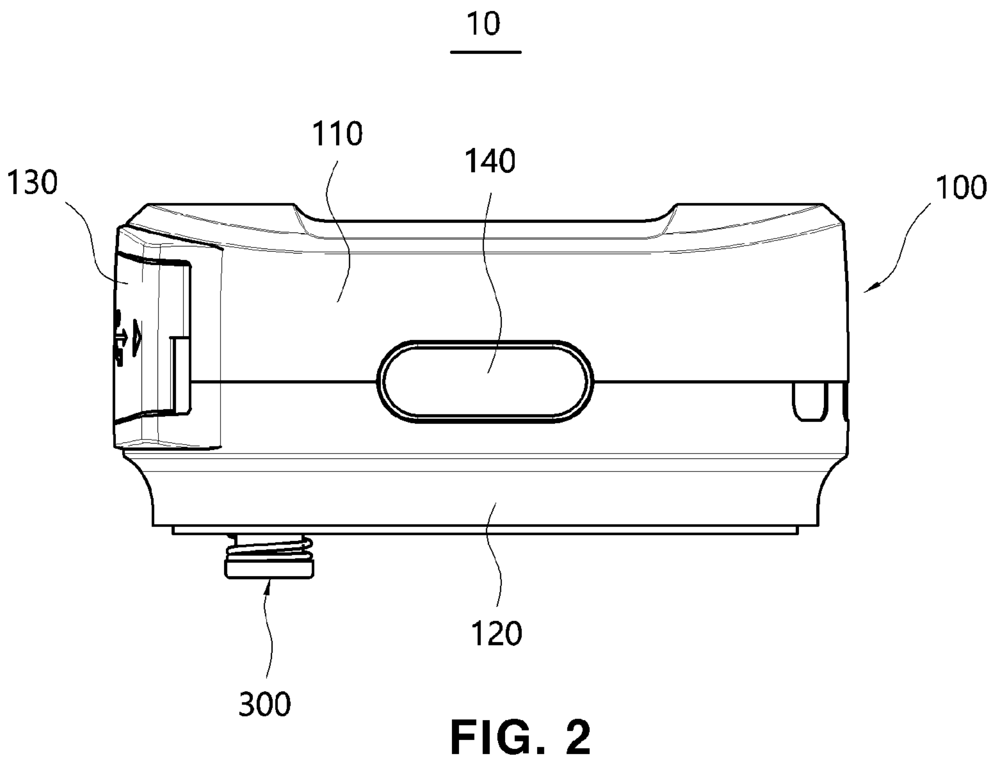
FIG. 2 is a right side view illustrating the sensor device of FIG. 1.
Figure 3:
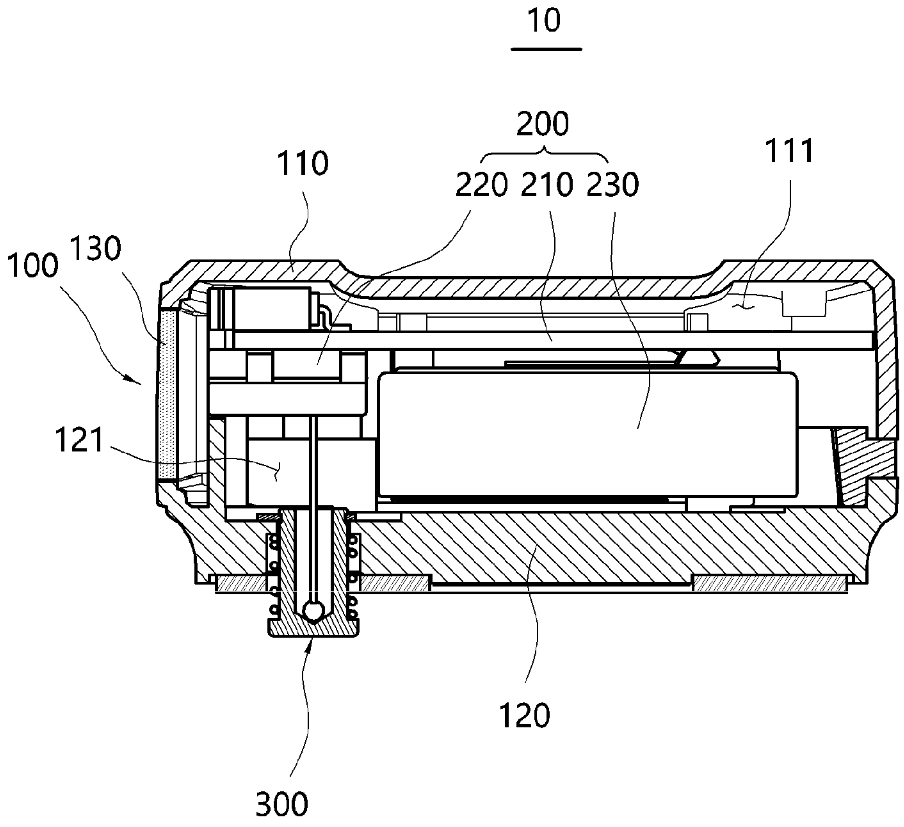
FIG. 3 is an A-A cross-sectional view illustrating the sensor device of FIG. 1.
Figure 4:
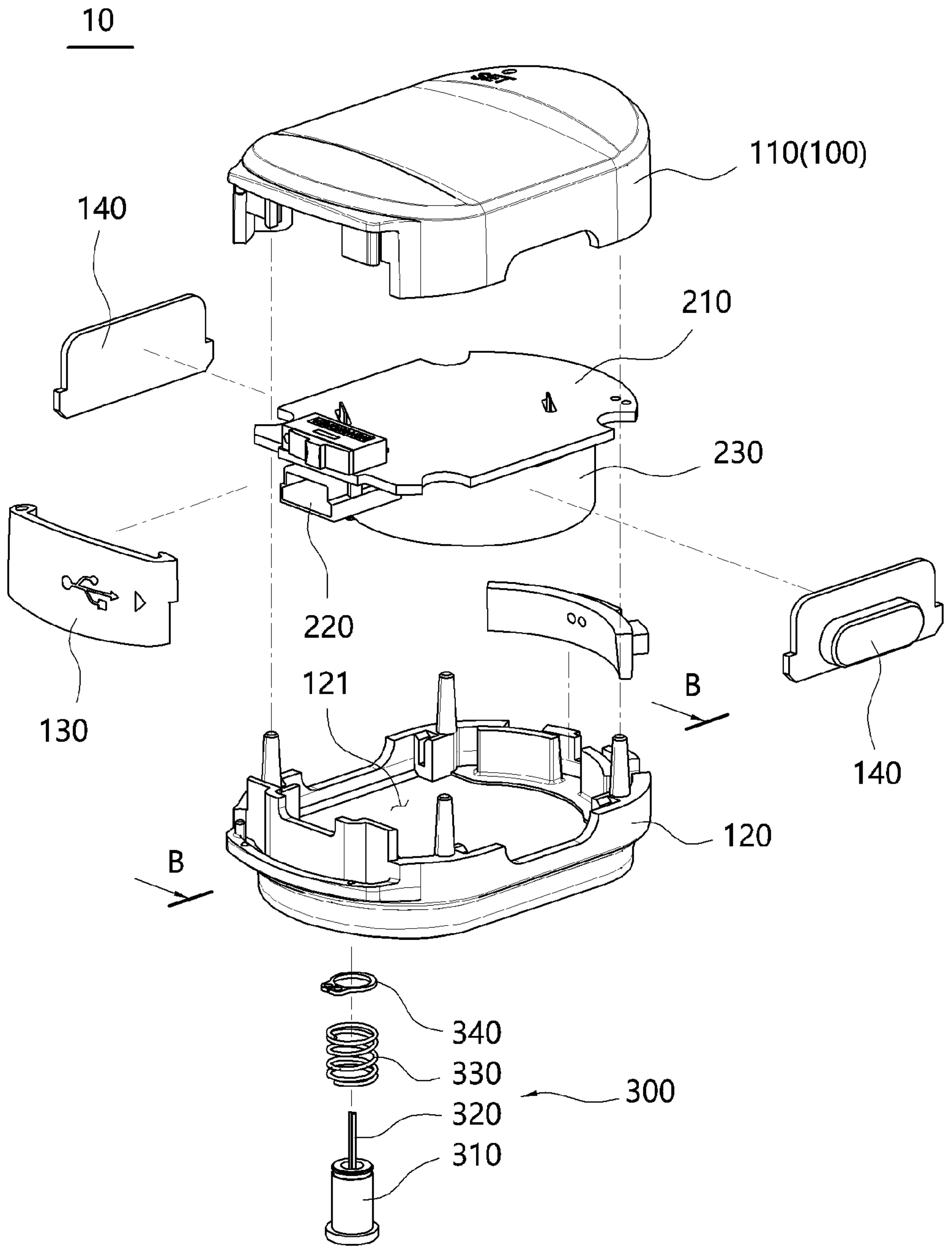
FIG. 4 is an exploded perspective view illustrating the sensor device of FIG. 1.

Hereinafter, with reference to the accompanying drawings, the exemplary embodiments of the present disclosure will be described in detail so that those skilled in the art can easily practice the present disclosure. The present disclosure may be embodied in many different forms and is not limited to the exemplary embodiments described herein. In order to clearly describe the present disclosure, parts that are irrelevant to the description are omitted in the drawings, and the same reference numerals are assigned to the same or similar components throughout the specification.

Words and terms used in the present specification and claims are not construed as limited in their ordinary or dictionary meanings, but in accordance with the principle that the inventors can define terms and concepts in order to best describe their disclosures, they must be interpreted as meanings and concepts that correspond to the technical ideas of the present disclosure.

Therefore, the exemplary embodiments described in the present specification and the configurations illustrated in the drawings correspond to a preferred exemplary embodiment of the present disclosure, and do not represent all the technical ideas of the present disclosure, and thus, there may be equivalents and variations for the corresponding configurations that may replace the same at the time of filing of the present disclosure.

In the following description, the descriptions of some components may be omitted to clarify the characteristics of the present disclosure.

1. Definition of Terms

The term “communication” as used in the following description means that one or more members are fluidly connected to each other. In an exemplary embodiment, communication may be formed by a member such as a conduit, pipe or piping.

The term “electrical conduction” used in the following description means that one or more members are connected to each other such that a current or an electrical signal can be transmitted. In an exemplary embodiment, the current may be formed in a wired form by a conducting wire member or the like or a wireless form such as Bluetooth, Wi-Fi or RFID.

The terms “upper side”, “lower side”, “left side”, “right side”, “front side” and “back side” used in the following description will be understood with reference to the coordinate system illustrated in FIGS. 1 and 5.

2. Description of the Configuration of the Sensor Device 10 According to an Exemplary Embodiment of the Present Disclosure Referring to FIGS. 1 to 4, the sensor device 10 according to an exemplary embodiment of the present disclosure is illustrated. The sensor device 10 according to an exemplary embodiment of the present disclosure includes a sensor module 300 for detecting the state of an external member. In this case, the sensor module 300 is provided with a component for improving the contact pressure (contact pressure) with the external member.

Therefore, the sensor module 300 and the external member may be disposed to be in close contact with each other. Accordingly, the sensor module 300 may accurately obtain target information. In addition, the coupled state between the sensor device 10 and the external member may be stably maintained.

The sensor device 10 described below may obtain any information about the state of the external member. For example, the sensor device 10 may detect information about the temperature, internal stress, humidity and the like of the external member. In the following description, it will be described on the premise that the sensor device 10 detects information about the temperature of the external member.

A band member (not illustrated) is coupled to the sensor device 10. Specifically, the band member (not illustrated) is coupled to the sensor device 10 through a band connection 140 to be described below. In addition, a band member (not illustrated) may surround the external member and be coupled with the external member. That is, a band member (not illustrated) may couple the sensor device 10 and the external member in a form of binding the sensor device 10 to the external member.

In the above exemplary embodiment, the band member (not illustrated) may be formed of a material having a predetermined elasticity. Alternatively, the band member (not illustrated) may be provided in a form whose length can be adjusted.

In an exemplary embodiment, the band member (not illustrated) may be formed of an electrically conductive material. For example, the band member (not illustrated) may be formed of a steel material.

In the above exemplary embodiment, when a current is energized in the external member to be measured, the band member (not illustrated) and the sensor device 10 coupled thereto may generate power by way of magnetic field energy harvesting.

Specifically, the band member (not illustrated) and the sensor device 10 coupled thereto may generate power in the form of electromagnetic induction by using a change in magnetic flux formed by changing the magnitude or direction of current energized in the external member.

In the above exemplary embodiment, since the power for operating the sensor device 10 may be directly generated, the miniaturization and independent installation of the sensor device 10 are possible.

The sensor device 10 may be operated in a wireless form. Information detected by the sensor device 10 may be transmitted to an external terminal in a wireless manner. That is, the sensor device 10 may conduct electricity with an external terminal in a wireless manner.

As will be described below, since the sensor device 10 includes a connector 220, the sensor device 10 may transmit information by conducting electricity with an external terminal even in a wired manner. That is, in the above exemplary embodiment, the sensor device 10 may transmit information by conducting electricity with an external terminal in a wired or wireless manner.

In order for the sensor device 10 to operate in a wireless form, the sensor device 10 may be provided with an independent power source. The power source may be provided in the form of a battery, and may be configured to be charged by an external power source and deliver power to other components of the sensor device 10.

In the illustrated exemplary embodiment, the sensor device 10 includes a housing 100, an electrically conducting part 200 and a sensor module 300.

The housing 100 forms an exterior of the sensor device 10. The housing 100 is a portion where the sensor device 10 is exposed to the outside. A space is formed inside the housing 100 such that various components of the sensor device 10 may be mounted therein.

The housing 100 may be formed of a lightweight yet highly rigid material. This is to prevent damage due to an external force while facilitating the movement and installation of the sensor device 10.

At the same time, the housing 100 may be formed of electrically insulating and thermally insulating materials. This is to prevent damage to the sensor device 10 caused by a high-voltage current or a high-temperature external environment. In an exemplary embodiment, the housing 100 may be formed of a synthetic resin material such as reinforced plastic.

The housing 100 may have any shape which is capable of detecting the external state by being coupled to the external member. In the illustrated exemplary embodiment, the housing 100 has a cross-section in which an extension length in the front-rear direction is longer than an extension length in the left-right direction, and is formed to have a height in the vertical direction. In addition, each end of the housing 100 in the front-back direction is formed to be rounded so as to be convex outward.

Figure 5:
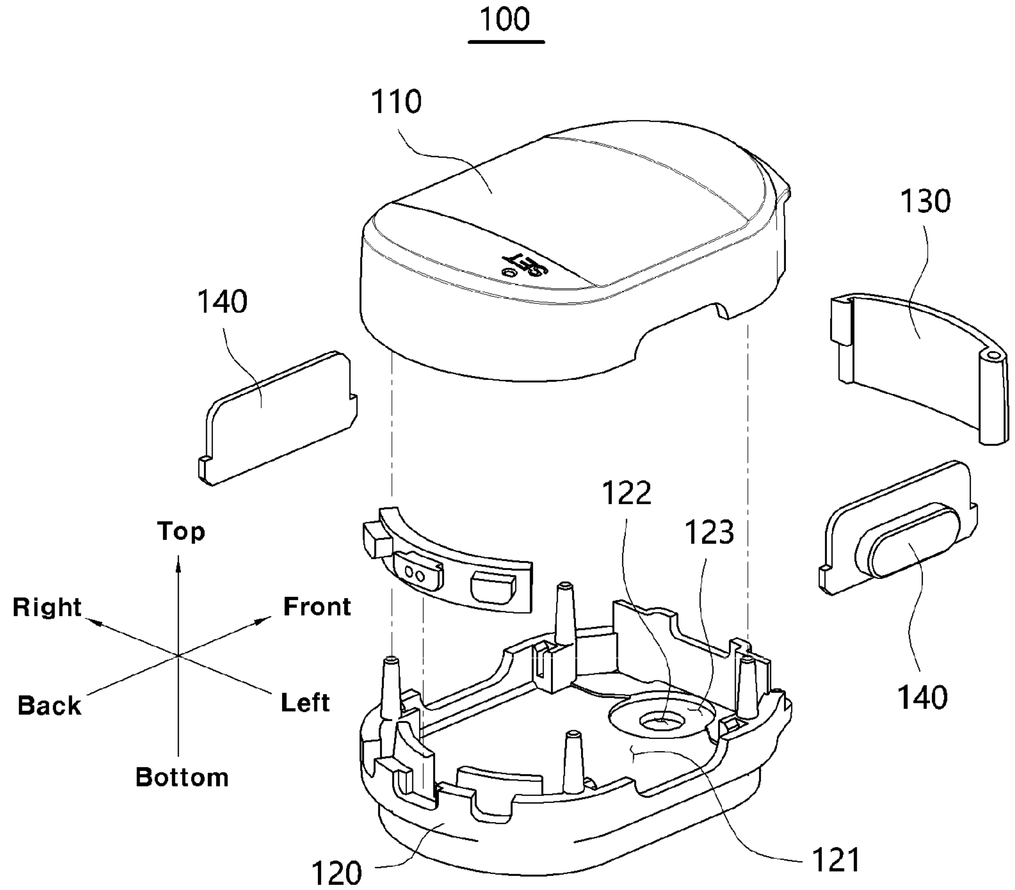
FIG. 5 is an exploded perspective view of another angle illustrating a housing included in the sensor device of FIG. 1.
Figure 6:
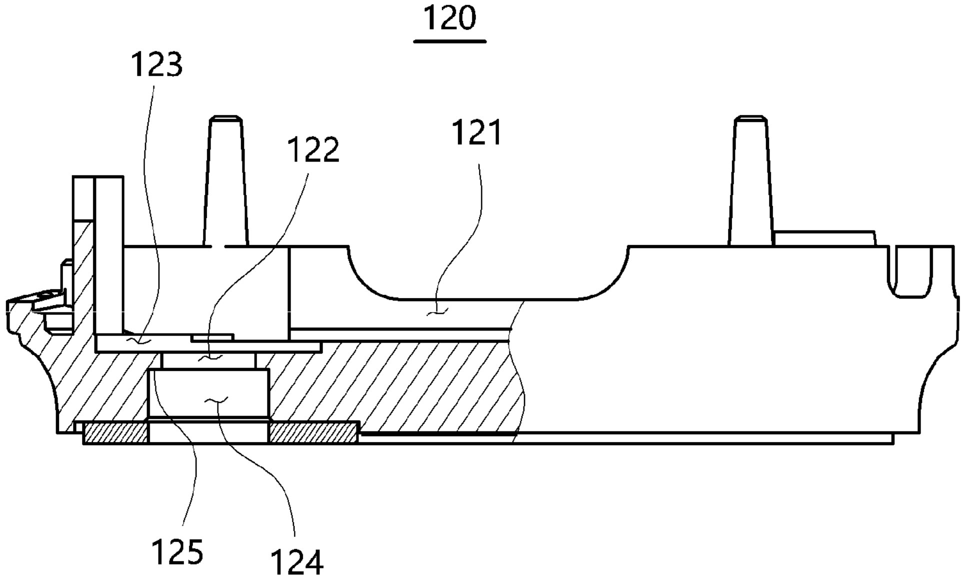
FIG. 6 is a B-B cross-sectional view illustrating a second housing included in the sensor device of FIG. 1.

In the exemplary embodiment illustrated in FIGS. 5 and 6, the housing 100 includes a first housing 110, a second housing 120, a connector cover 130 and a band connector 140.

The first housing 110 forms one side of the housing 100, which is the upper side in the illustrated exemplary embodiment. The first housing 110 forms a portion of the exterior of the housing 100.

The first housing 110 is coupled to the second housing 120. In an exemplary embodiment, the first housing 110 may be detachably coupled to the second housing 120. A space formed inside the first housing 110 may communicate with a space formed inside the second housing 120. In the illustrated exemplary embodiment, the second housing 120 is coupled to a lower side of the first housing 110.

The first housing 110 is coupled to the connector cover 130. The connector cover 130 is rotatably coupled to the first housing 110. In the illustrated exemplary embodiment, the connector cover 130 is coupled to a front side end of the first housing 110.

The first housing 110 is coupled to a band connection 140. The band connection 140 may be configured to communicate the inner space and the outside of the first housing 110. A band member (not illustrated) passing through the band connection 140 may extend across the inner space of the first housing 110. In the illustrated exemplary embodiment, the band connection 140 is disposed on the left side and right side of the first housing 110.

Although reference numerals are not assigned, the first housing 110 may include an operating button. The operating button may be pressed and manipulated by an operator to start or stop the operation of the sensor device 10.

In the illustrated exemplary embodiment, the first housing 110 includes a first space 111.

The first space 111 is a space formed inside the first housing 110. The first space 111 accommodates some components of the sensor device 10. In the illustrated exemplary embodiment, the first space 111 accommodates portions of the PCB 210, the connector 220 and the power supply unit 230 of the electrically conducting part 200.

The first space 111 is partially surrounded by the inner periphery of the first housing 110. In the illustrated exemplary embodiment, portions of the upper side and the front side, portions of the back side and the left side, and a portion of the right side of the first space 111 are surrounded by the inner periphery of the first housing 110.

The remaining portion of the front side, the remaining portion of the left side and the remaining portion of the right side of the first space 111 are surrounded by the connector cover 130 and the band connection 140, respectively.

The first space 111 communicates with the outside. Specifically, the first space 111 communicates with the outside in the width direction, which is the left-right direction in the illustrated exemplary embodiment, by the band connection 140. A band member (not illustrated) may cross the first space 111 in the width direction, that is, in the left-right direction, and pass through the pair of band connections 140, respectively.

The first space 111 conducts electricity with the outside. The electrically conducting part 200 accommodated in the first space 111 may conduct electricity with the outside to receive power or transmit detected information to an external terminal. As described above, the connection may be formed in a wired or wireless manner.

The first space 111 communicates with the second space 121. Some components accommodated in the first space 111 may also be accommodated in the second space 121. In addition, as will be described below, the sensor module 300 is accommodated in the second space 121 and is movably provided toward the first space 111. In the illustrated exemplary embodiment, the lower side of the first space 111 communicates with the upper side of the second space 121.

The second housing 120 forms the other side of the housing 100, which is the lower side in the illustrated exemplary embodiment. The second housing 120 forms another portion of the exterior of the housing 100.

The second housing 120 is coupled to the first housing 110. In an exemplary embodiment, the second housing 120 may be detachably coupled to the first housing 110. A space formed inside the second housing 120 may communicate with a space formed inside the first housing 110. In the illustrated exemplary embodiment, the first housing 110 is coupled to an upper side of the second housing 120.

The second housing 120 is coupled to a connector cover 130. The connector cover 130 is rotatably coupled to the second housing 120. In the illustrated exemplary embodiment, the connector cover 130 is coupled to a front side end of the second housing 120.

The second housing 120 is coupled to a band connection 140. The band connection 140 may be configured to communicate the inner space and the outside of the second housing 120. A band member (not illustrated) passing through the band connection 140 may extend across the inner space of the second housing 120. In the illustrated exemplary embodiment, the band connection 140 is disposed on the left side and right side of the second housing 120.

The second housing 120 is coupled to a sensor module 300. The sensor module 300 is movably coupled to the second housing 120. To this end, an opening (reference numeral not assigned) through which the sensor module 300 is coupled to penetrate may be formed to penetrate through the inside of the second housing 120.

Accordingly, when the sensor device 10 is pressed toward the external member, the sensor module 300 may be moved up and down such that the length of the portion accommodated inside the second housing 120 increases. In the illustrated exemplary embodiment, the sensor module 300 is coupled to a lower side of the second housing 120.

Accordingly, the contact state between the sensor module 300 and the external member may be stably formed. The detailed description thereof will be described below.

In the illustrated exemplary embodiment, the second housing 120 includes a second space 121, a support through-hole 122, a support depression 123, a lifting space 124 and an elastic member support 125.

The second space 121 is a space formed inside the second housing 120. The second space 121 accommodates some components of the sensor device 10. In the illustrated exemplary embodiment, the second space 121 accommodates portions of the PCB 210, the connector 220 and the power supply unit 230 of the electrically conducting part 200.

The second space 121 is partially surrounded by the inner periphery of the second housing 120. In the illustrated exemplary embodiment, portions of the lower side and the front side, portions of the back side and the left side, and a portion of the right side of the second space 121 are formed to be surrounded by the inner periphery of the second housing 120.

The remaining portion of the front side, the remaining portion of the left side, and the remaining portion of the right side of the second space 121 are surrounded by the connector cover 130 and the band connection 140, respectively.

The second space 121 communicates with the outside. Specifically, the second space 121 communicates with the outside in the width direction, which is left-right direction in the illustrated exemplary embodiment, by the band connection 140. A band member (not illustrated) may cross the second space 121 in the width direction, that is, in the left-right direction, and pass through the pair of band connections 140, respectively.

As described above, the band member (not illustrated) may also be arranged to cross the first space 111. Accordingly, it can be said that the band member (not illustrated) is disposed to cross the first space 111 or the second space 121.

The second space 121 conducts electricity with the outside. The electrically conducting part 200 accommodated in the second space 121 may conduct electricity with the outside to receive power or transmit detected information to an external terminal. As described above, the connection may be formed in a wired or wireless manner.

The second space 121 communicates with the first space 111. Some components accommodated in the second space 121 may also be accommodated in the first space 111.

The second space 121 communicates with the support through-hole 122. The sensor module 300 partially accommodated in the support through-hole 122 may be lifted and entered into or taken out of the second space 121.

The second space 121 communicates with the lifting space 124 through the support through-hole 122. The sensor module 300 which is partially accommodated in the lifting space 124 may be lifted and entered into or taken out of the second space 121 through the support through-hole 122.

In the illustrated exemplary embodiment, the front lower portion of the second space 121 communicates with the support through-hole 122 and the lifting space 124.

The support through-hole 122 partially accommodates the sensor module 300. The sensor module 300 may be lifted while being accommodated in the support through-hole 122.

Accordingly, it can be said that the support through-hole 122 accommodates the sensor module 300 in an elevating manner.

The support through-hole 122 communicates with the second space 121. The sensor module 300 which is accommodated in the support through-hole 122 may be lifted and drawn into or taken out of the second space 121. In the illustrated exemplary embodiment, the upper end of the support through-hole 122 communicates with the front lower side of the second space 121.

The support through-hole 122 communicates with a support depression 123. A portion of the sensor module 300 accommodated in the support through-hole 122, that is, the fixed ring 340 may be accommodated in the support depression 123. In the illustrated exemplary embodiment, the support through-hole 122 is formed inside the support depression 123.

The support through-hole 122 communicates with the lifting space 124. The sensor module 300 may be partially accommodated in the support through-hole 122 and the lifting space 124 so as to be partially liftable. In the illustrated exemplary embodiment, the lower end of the support through-hole 122 communicates with the upper end of the lifting space 124.

The support through-hole 122 may have any shape which is capable of accommodating the sensor module 300 in an elevating manner. In the illustrated exemplary embodiment, the support through-hole 122 has a circular cross-section and extends in the thickness direction of the housing 100, that is, in the vertical direction. That is, the support through-hole 122 is formed through the lower side of the front side of the second housing 120.

An upper end of the support through-hole 122 is formed to be open to communicate with the second space 121. The lower end of the support through-hole 122 is formed to be open and communicates with the upper end of the lifting space 124.

In an exemplary embodiment where the cross-section of the support through-hole 122 is formed in a circular shape, the cross-section of the support through-hole 122 may be formed to have a predetermined diameter.

In an exemplary embodiment, the diameter of the cross-section of the support through-hole 122 may be formed to be smaller than the outer diameter of the fixed ring 340 and greater than the first diameter (d1) or the fifth diameter (d5) of the sensor module 300. Furthermore, the diameter of the cross-section of the support through-hole 122 may be formed to be smaller than the outer diameter of the elastic member 330 of the sensor module 300.

Therefore, the elastic member 330 of the sensor module 300 and the fixed ring 340 do not enter the inside of the support through-hole 122. At the same time, the body part 310 of the sensor module 300 may move up and down inside the support through-hole 122.

The support depression 123 accommodates the fixed ring 340 of the sensor module 300. The fixed ring 340 is supported by the inner surface of the second housing 120 surrounding the support depression 123 on one side, which is the lower side in the illustrated exemplary embodiment. Accordingly, the fixed ring 340 does not enter the inside of the support through-hole 122.

The support depression 123 is formed to be recessed on the inner surface of the second housing 120, which is the lower inner surface of the front side in the illustrated exemplary embodiment. A support through-hole 122 is formed to penetrate through the inside of the support depression 123 and communicates with the support depression 123.

The support depression 123 may be any shape which is capable of accommodating the fixed ring 340 therein. In the illustrated exemplary embodiment, the support depression 123 has a circular plate shape with a circular cross-section and a thickness in the vertical direction.

In this case, the diameter of the cross-section of the support depression 123 is formed to be greater than the outer diameter of the fixed ring 340 such that the fixed ring 340 may be completely accommodated in the support depression 123.

The lifting space 124 partially accommodates the sensor module 300. The sensor module 300 may be lifted while being accommodated in the lifting space 124. Accordingly, it can be said that the lifting space 124 also accommodates the sensor module 300 in an elevation manner.

The lifting space 124 communicates with the second space 121. Specifically, the lifting space 124 communicates with the second space 121 through the support through-hole 122. The sensor module 300 which is accommodated in the lifting space 124 may be lifted and drawn into or taken out of the second space 121. In the illustrated exemplary embodiment, the upper end of the lifting space 124 communicates with the second space 121 through the lower end of the support through-hole 122.

The lifting space 124 communicates with the outside. Another portion of the sensor module 300 may pass through the lifting space 124 and be exposed to the outside. In the illustrated exemplary embodiment, the lower end of the lifting space 124 is formed to be open such that the body part 310, the sensing element 320 and the elastic member 330 of the sensor module 300 may be partially exposed.

The lifting space 124 may have any shape which is capable of accommodating the sensor module 300 in an elevation manner. In the illustrated exemplary embodiment, the lifting space 124 has a circular cross-section and extends in the thickness direction of the housing 100, that is, in the vertical direction. That is, the lifting space 124 is formed to penetrate through the lower side of the front side of the second housing 120.

An upper end of the lifting space 124 is formed to be open and communicates with the support through-hole 122. The lower end of the lifting space 124 is formed to be open and communicates with the outside, which is the lower side of the second housing 120 in the illustrated exemplary embodiment.

In an exemplary embodiment where the cross-section of the lifting space 124 is formed in a circular shape, the cross-section of the lifting space 124 may have a predetermined diameter.

In an exemplary embodiment, the diameter of the cross-section of the lifting space 124 may be formed to be greater than the diameter of the cross-section of the support through-hole 122 and the outer diameter of the elastic member 330. In addition, the diameter of the cross-section of the lifting space 124 may be formed to be greater than the first diameter (d1) or the fifth diameter (d5) of the sensor module 300. Furthermore, the cross-section of the lifting space 124 may have a diameter greater than the fourth diameter (d4) of the sensor module 300.

Accordingly, the body part 310 and the elastic member 330 of the sensor module 300 may be lifted while being accommodated in the lifting space 124. That is, the sensor module 300 may be moved in a direction toward the second housing 120, that is, upward until the base 314, which will be described below, is positioned on the same plane as the lower surface of the second housing 120.

The support through-hole 122 and the lifting space 124 may be divided by the elastic member support 125.

The elastic member support 125 is located at a portion where the support through-hole 122 and the lifting space 124 communicate. The elastic member support 125 supports one end of the elastic member 330, which is an upper end in the illustrated exemplary embodiment. The elastic member 330 is supported by the elastic member support 125 and does not move to the support through-hole 122. In addition, the elastic member 330 may be compressed or stretched in the longitudinal direction thereof by supporting the one end of the elastic member support 125.

The elastic member support 125 is formed to protrude from the radial outside of the support through-hole 122 toward the inside, thereby forming a structural difference between the cross-section of the support through-hole 122 and the cross-section of the lifting space 124. By the elastic member support 125, the diameter of the cross-section of the support through-hole 122 may be formed to be smaller than the diameter of the cross-section of the lifting space 124.

The elastic member support 125 may radially surround the support through-hole 122 from the outside and extend along the extension direction of the support through-hole 122. In the illustrated exemplary embodiment, the elastic member support 125 extends in the vertical direction. The upper end of the elastic member support 125 may form a lower side in the support depression 123. The lower end of the elastic member support 125 may form a radially outer side of the upper end of the lifting space 124.

The connector cover 130 is configured to expose or seal the connector 220 of the electrically conducting part 200 to the outside. While the sensor device 10 is operating, the connector 220 is covered by the connector cover 130 so as not to be exposed to the outside. When charging of the power supply unit 230 or movement of information is required, the connector cover 130 may be opened to expose the connector 220 to the outside.

The connector cover 130 is rotatably coupled to the first housing 110 and the second housing 120. In the illustrated exemplary embodiment, the connector cover 130 is located at the front side ends of the first housing 110 and the second housing 120.

One side of the connector cover 130 facing the first housing 110, which is the upper side in the illustrated exemplary embodiment, is rotatably coupled to the front side end of the first housing 110. The other side of the connector cover 130 facing the second housing 120, which is the lower side in the illustrated exemplary embodiment, is rotatably coupled to the front end of the second housing 120.

The connector cover 130 may be formed of an electrical insulating material. In addition, the connector cover 130 may be formed of a material having predetermined elasticity, and may be fitted into and coupled to spaces formed at front sides of the first housing 110 and the second housing 120. In an exemplary embodiment, the connector cover 130 may be formed of a rubber material.

The band connection 140 is a portion to which a band member (not illustrated) for fixing the sensor device 10 to the external member is coupled. The band connection 140 is coupled to the first housing 110 and the second housing 120, respectively.

The band connection 140 may be configured to communicate the first space 111 and the second space 121. In the illustrated exemplary embodiment, the band connection 140 is provided to be closed. Alternatively, a slit for passing a band member (not illustrated) may be formed in the band connection 140. In the above exemplary embodiment, the slit (not illustrated) may be formed to extend in the extension direction of the band connection 140, which is the front-back direction in the illustrated exemplary embodiment.

The band connection 140 is formed to extend in a direction in which the first housing 110 or the second housing 120 extends to be long, which is in the front-back direction in the illustrated exemplary embodiment. Each end of the extension direction of the band connection 140, which is the front side end and the back side end in the illustrated exemplary embodiment, is respectively formed to be rounded so as to be convex outward.

The band connection 140 is formed to have a predetermined thickness in the thickness direction of the housing 100, which is the vertical direction in the illustrated exemplary embodiment. Accordingly, a portion of the band connection 140 in the thickness direction may be coupled to the first housing 110 and a remaining portion in the thickness direction may be coupled to the second housing 120.

In the above exemplary embodiment, the slit (not illustrated) may be formed to extend in the extension direction of the band connection 140, which is the front-back direction in the illustrated exemplary embodiment.

A plurality of band connections 140 may be provided. The plurality of band connections 140 may be disposed to face each other with the first space 111 or the second space 121 interposed therebetween. In the illustrated exemplary embodiment, two band connections 140 are provided and disposed to be spaced apart from each other in the width direction of the housing 100, that is, in the left-right direction.

After the band member (not illustrated) penetrates through any one band connection 140 of the plurality of band connections 140 and extends across the first space 111 or the second space 121, it may penetrate through the other one band connection 140 and extend to the outside of the housing 100.

The electrically conducting part 200 conducts electricity with the sensor module 300 to supply power that is necessary for the operation of the sensor module 300. The electrically conducting part 200 may conduct electricity with an external power source to receive the power.

The electrically conducting part 200 may be provided in a wireless form. That is, the electrically conducting part 200 may be configured to supply power to the sensor module 300 even when it does not conduct electricity with an external power source. Accordingly, it will be understood that the sensor device 10 may be operated in a wireless manner.

The electrically conducting part 200 is accommodated inside the housing 100. Specifically, a portion of the electrically conducting part 200 is accommodated in the first space 111, and another portion of the electrically conducting part 200 is accommodated in the second space 121. The arrangement may be achieved by communicating the first space 111 and the second space 121 with each other.

The electrically conducting part 200 may be configured to be exposed to the outside or closed. Specifically, when the connector cover 130 is operated to be rotated, the connector 220 to be described below may be exposed to the outside. An operator may supply power to the electrically conducting part 200 or transmit information by inserting a pin or the like into the connector 220.

The electrically conducting part 200 conducts electricity with the sensor module 300. Information detected by the sensor module 300 may be transmitted to the electrically conducting part 200. In addition, power required for the operation of the sensor module 300 may be transferred from the electrically conducting part 200 to the sensor module 300.

In the illustrated exemplary embodiment, the electrically conducting part 200 includes a printed circuit board (PCB) 210, a connector 220 and a power supply unit 230.

The PCB 210 electrically conducts the connector 220 and the power supply unit 230. Power transferred from the outside through the connector 220 may be transferred to the power supply unit 230 through the PCB 210.

The PCB 210 is accommodated in the inner space of the housing 100. In the illustrated exemplary embodiment, the PCB 210 is accommodated in the first space 111. When the first housing 110 and the second housing 120 are coupled, the PCB 210 is not arbitrarily exposed to the outside.

The PCB 210 conducts electricity with the sensor module 300. Information detected by the sensor module 300 may be transmitted to the connector 220 through the PCB 210. Since the operation process of the PCB 210 is a well-known technique, the detailed description thereof will be omitted.

A connector 220 is disposed adjacent to the PCB 210.

The connector 220 conducts electricity with an external power source to receive power that is necessary for operating the sensor device 10. In addition, the connector 220 may conduct electricity with the sensor module 300 to transfer detected information to the outside.

The connector 220 conducts electricity with the PCB 210. Power that is transferred to the connector 220 may be delivered to the power supply unit 230 or the sensor module 300 through the PCB 210.

The connector 220 may be exposed to the outside or sealed by the connector cover 130. Accordingly, in a situation where the power supply to an external power source or terminal is not required, the connector 220 may be accommodated in the inner space of the housing 100 and not be affected by the external environment.

The connector 220 is positioned adjacent to the PCB 210. In the illustrated exemplary embodiment, the connector 220 is coupled to the lower side of the PCB 210. The connector 220 and PCB 210 conduct electricity.

An external pin member (not illustrated) may be retractably inserted into the connector 220. By the insertion, the electrically conducting part 200 may conduct electricity with an external power source or terminal.

The power supply unit 230 stores power that is required for the sensor device 10 and transfers the stored power to components. The power supply unit 230 conducts electricity with each component of the sensor device 10.

The power supply unit 230 conducts electricity with an external power supply. Power supplied from an external power source may be transferred to and stored in the power supply unit 230. The power supply unit 230 may be energized with external power through the PCB 210 or the connector 220.

In an exemplary embodiment, the power supply unit 230 may be provided in the form of a battery that stores the received power and transfers the same to other components. In the above exemplary embodiment, the sensor device 10 may be operated in a wireless form.

The power supply unit 230 conducts electricity with the PCB 210. A control signal which is required for the operation of the power supply unit 230 may be applied from the PCB 210.

The power supply unit 230 conducts electricity with the sensor module 300. Power which is required to operate the sensor module 300 may be supplied from the power supply unit 230.

Figure 7:
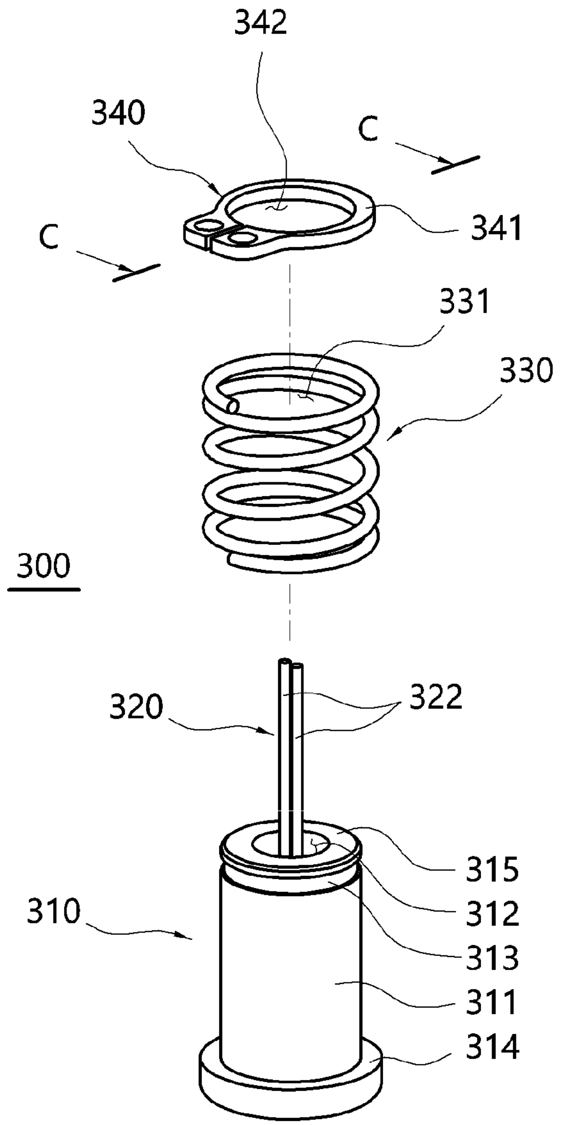
FIG. 7 is an exploded perspective view illustrating a sensor module included in the sensor device of FIG. 1.
Figure 8:
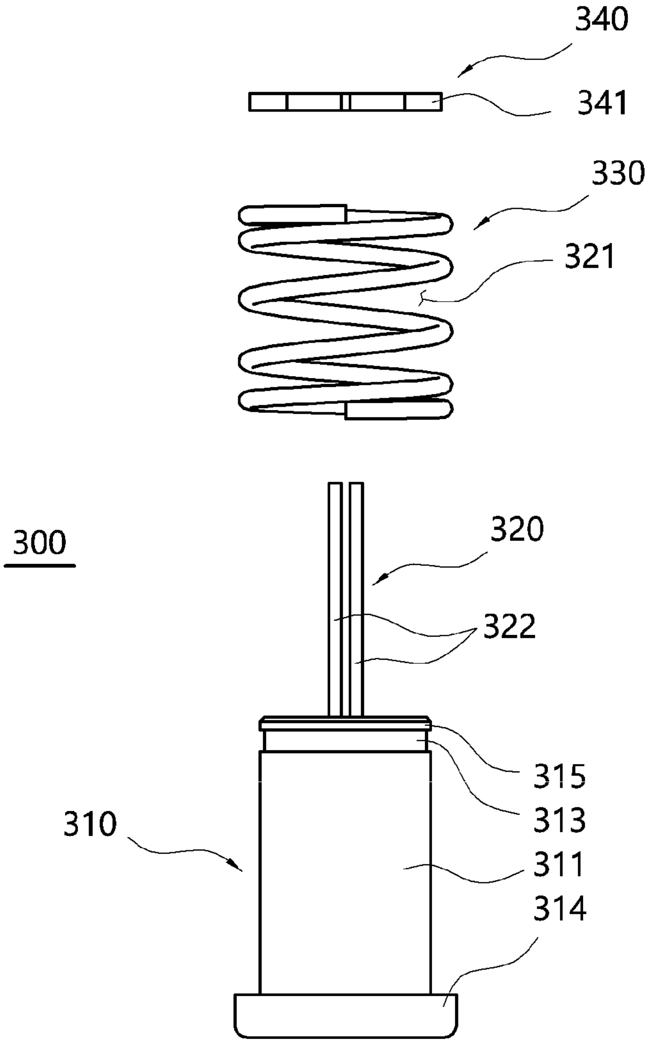
FIG. 8 is an exploded side view illustrating the sensor module of FIG. 7.
Figure 9:
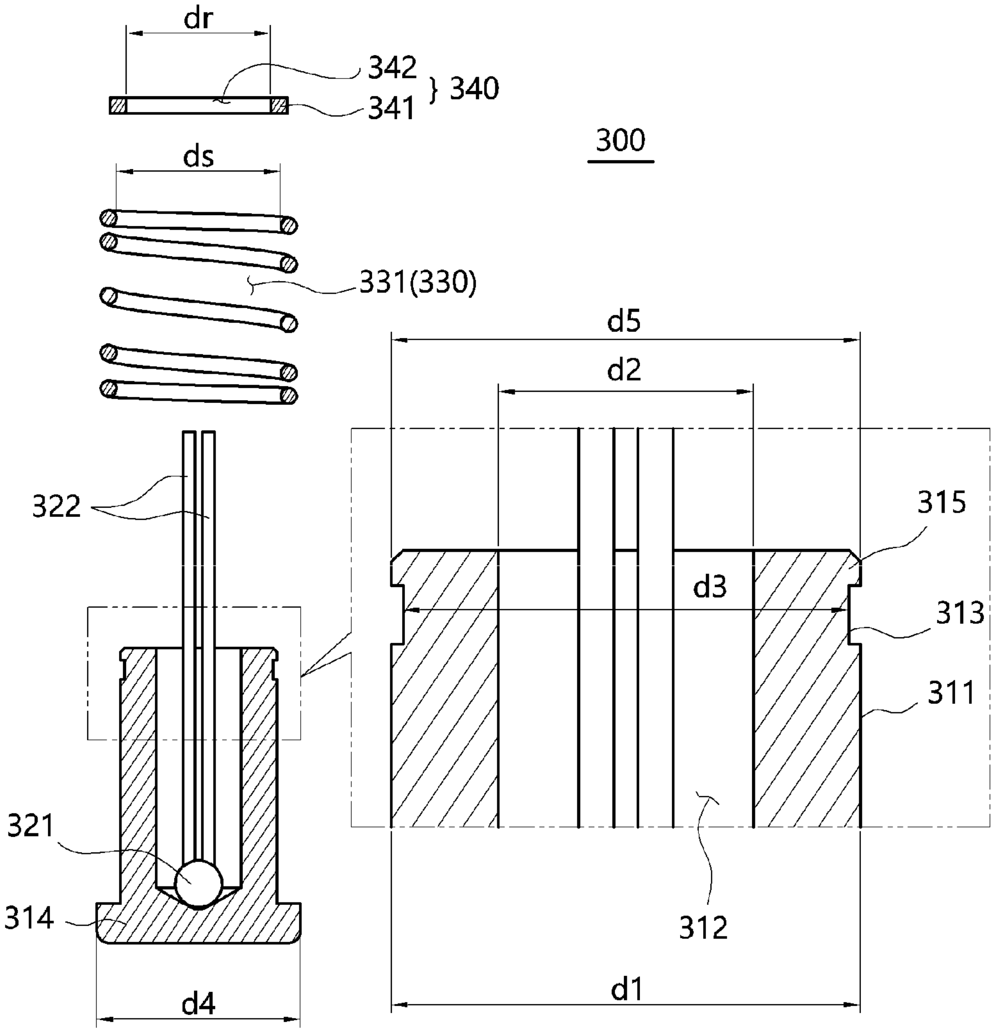
FIG. 9 is a C-C cross-sectional view illustrating the sensor module of FIG. 7.

Referring to FIGS. 7 to 9, the sensor device 10 according to an exemplary embodiment of the present disclosure includes a sensor module 300.

The sensor module 300 detects information about the external member. In an exemplary embodiment, the sensor module 300 may be configured to detect information that is related to temperature, humidity and the like of the external member.

Information detected by the sensor module 300 may be delivered to an external terminal through the electrically conducting part 200. Power required for the operation of the sensor module 300 may be transmitted from the electrically conducting part 200. The sensor module 300 conducts electricity with the electrically conducting part 200.

In an exemplary embodiment, the sensor module 300 may be configured to detect information by being in contact with the external member. In the above exemplary embodiment, the contact state between the sensor module 300 and the external member must be stably maintained for the accuracy and continuity of detected information.

Accordingly, the sensor module 300 according to an exemplary embodiment of the present disclosure includes components for improving contact pressure with the external member. The sensor module 300 presses the external member and is configured to come into contact with the external member. Accordingly, the sensor module 300 and the external member may be reliably contacted.

The sensor module 300 is coupled to the housing 100. Specifically, the sensor module 300 is coupled to the housing 100 so as to be upwardly liftable. In a state where no external force is applied, the sensor module 300 may be partially exposed to the outside of the housing 100.

The sensor module 300 is movably coupled to the housing 100. As the external force is applied, the sensor module 300 may be lifted in a direction toward the inner space of the housing 100 or may be lowered in a direction toward the outside of the housing 100.

That is, the sensor module 300 is coupled to the housing 100 in a retractable form.

In the illustrated exemplary embodiment, the sensor module 300 includes a body part 310, a sensing element 320, an elastic member 330 and a fixed ring 340.

The body part 310 forms a portion of the exterior of the sensor module 300. The body part 310 accommodates the sensing element 320 therein. The body part 310 is coupled to the housing 100 to be movable.

The body part 310 is partially accommodated in the second housing 120. In other words, a portion of the body part 310 is exposed to the outside of the second housing 120, which is the lower side in the illustrated exemplary embodiment. The exposed portion of the body part 310 may be configured to come into contact with the external member.

The body part 310 is movably coupled to the second housing 120. Specifically, the body part 310 is movably coupled to the support through-hole 122 and the lifting space 124 formed in the second housing 120.

The body part 310 extends in a direction in which the support through-hole 122 and the lifting space 124 extend, which is the vertical direction in the illustrated exemplary embodiment.

One end of each end in the extension direction of the body part 310 accommodated in the second space 121, which is the upper side end in the illustrated exemplary embodiment, is exposed to the upper side of the support through-hole 122 and accommodated in the second space 121. The other end exposed to the outside of the second housing 120 among the ends of each end of the body part 310 in the extension direction, which is the lower side end in the illustrated exemplary embodiment, is in contact with the external member.

The body part 310 may be formed of a material having high thermal conductivity. In an exemplary embodiment, the body part 310 may be formed of a copper (Cu) material or an alloy material including the same.

A space is formed inside the body part 310. The sensing element 320 is accommodated in the space.

The body part 310 may have any shape which is capable of accommodating the sensing element 320, detecting external temperature and being movably coupled to the second housing 120. In the illustrated exemplary embodiment, the body part 310 extends in the vertical direction, and has a cylindrical shape in which the cross-sectional diameter is partially changed along the extension direction.

In the illustrated exemplary embodiment, the body part 310 includes a body outer periphery 311, a body hollow 312, a coupling groove 313, a base 314 and a body end 315.

The body outer periphery 311 is defined as an outer periphery of the body part 310. In the illustrated exemplary embodiment, since the body part 310 has a cylindrical shape, the body outer periphery 311 may be defined as an outer side of the body part 310 in the radial direction, that is, a side portion.

The cross-section of the body outer periphery 311 may be formed in a ring shape in which the hollow body 312 is formed to penetrate through. In this case, the first diameter (d1), which is the diameter of the cross-section of the body outer periphery 311, may be formed to be smaller than the diameters of the support through-hole 122 and the lifting space 124.

Accordingly, the body part 310 may be smoothly lifted inside the support through-hole 122 and the lifting space 124.

An elastic member 330 is wound around the body outer periphery 311. In addition, a fixed ring 340 is provided adjacent to one end of the body outer periphery 311 in the extension direction, which is the upper end in the illustrated exemplary embodiment.

The hollow body 312 is a space formed inside the body part 310. The sensing element 320 is partially accommodated in the body hollow 312. Specifically, portions of the sensing body 321 of the sensing element 320 and the sensing cable 322 may be accommodated in the hollow body 312.

The body hollow 312 is formed to extend in a direction in which the body part 310 extends, which is the vertical direction in the illustrated exemplary embodiment. One end of the extension direction of the body hollow 312, which is the upper side end in the illustrated exemplary embodiment, is formed to be open to communicate with the outside. The sensing element 320 may enter the hollow body 312 through the one end.

The other end in the extension direction of the body hollow 312, which is the lower end in the illustrated exemplary embodiment, is closed. In this case, the lower end of the body hollow 312 may come into contact with the sensing body 321.

An arbitrary material for fixing the accommodated sensing element 320 may be filled in the hollow body 312. In this case, the material may be formed of a material having high thermal conductivity. Accordingly, heat transferred to the base 314 in contact with the external member may be transferred to the sensing body 321 through the material without heat loss.

In an exemplary embodiment, the material filling the hollow body 312 may be formed of a synthetic resin material such as epoxy.

The body hollow 312 may be formed in any shape which is capable of accommodating and fixing the sensing element 320. In the illustrated exemplary embodiment, the body hollow 312 has a circular cross-section and extends in the vertical direction. In this case, the second diameter (d2), which is the diameter of the body hollow 312, may be formed to be smaller than the first diameter (d1), the third diameter (d3), the fourth diameter (d4) and the fifth diameter (d5).

The coupling groove 313 is a portion where the fixed ring 340 is coupled to the body part 310. The fixed ring 340 may be pressed radially inward to reduce the diameter thereof after being accommodated in the coupling groove 313.

The coupling groove 313 is formed to be recessed in the body outer periphery 311. In other words, the coupling groove 313 is recessed radially inward from the outer peripheral surface of the body part 310. The coupling groove 313 extends along the outer peripheral direction of the body part 310.

The coupling groove 313 may be formed to be biased at one end of each end of the body part 310 in the extension direction toward the second space 121, which is the upper side end in the illustrated exemplary embodiment. An upper portion of the coupling groove 313 may be located above the support depression 123, and a lower portion of the coupling groove 313 may be located below the support depression 123.

The third diameter (d3), which is the diameter of the coupling groove 313, may be formed to be smaller than the first diameter (d1), which is the diameter of the body outer periphery 311, and the fifth diameter (d5), which is the diameter of the body end 315. As will be described below, the outer diameter of the fixed ring 340 inserted into the coupling groove 313 may be formed to be greater than the first diameter (d1) and the fifth diameter (d5).

Accordingly, the body part 310 may be lifted with respect to the second housing 120 in a state where the upper portion of the coupling groove 313 is positioned above the support depression 123. Accordingly, any separation of the sensor module 300 coupled to the housing 100 may be prevented.

The base 314 forms the other end of the extension direction of the body part 310, which is the lower side end in the illustrated exemplary embodiment. The base 314 is a portion where the sensor module 300 directly contacts the external member.

In addition, the base 314 is a portion where the sensor module 300 is exposed to the outside. That is, in a state where the sensor module 300 is maximally accommodated inside the second housing 120, the base 314 may be exposed to the outside.

Therefore, even when the length of the body part 310 inserted into the second housing 120 is maximized, the base 314 is in contact with the external member such that information such as temperature or the like may be detected.

The base 314 may be provided in any form which is capable of detecting information such as temperature by being in contact with the external member. In the illustrated exemplary embodiment, the base 314 is a disk shape having a circular cross-section and a thickness in the vertical direction.

In this case, the fourth diameter (d4), which is the diameter of the cross-section of the base 314, may be formed to be greater than the first diameter (d1), the second diameter (d2), the third diameter (d3) and the fifth diameter (d5). That is, the cross-section of the base 314 is formed to have a greater diameter than the cross-section of other portions of the body part 310.

In addition, the fourth diameter (d4) may be formed to be greater than the diameter of the support through-hole 122, but smaller than the diameter of the lifting space 124. Accordingly, as the sensor module 300 is lifted, the base 314 may be partially accommodated in the lifting space 124.

The body end 315 forms the one end of the extension direction of the body part 310, which is the upper side end in the illustrated exemplary embodiment. The body end 315 is located on the upper side of the coupling groove 313 and is accommodated in the second space 121.

In other words, even when the sensor module 300 is lifted, the body end 315 remains accommodated in the second space 121. This is achieved by the fixed ring 340 which is coupled to the coupling groove 313.

A cross-section of the body end 315 may be formed in a circular shape having a predetermined diameter. In this case, the fifth diameter (d5), which is the diameter of the body end 315, may be the same as the first diameter (d1), but smaller than the fourth diameter (d4).

Accordingly, the body part 310 is lifted in the support through-hole 122 and the lifting space 124, but the base 314 may not be lifted up to the support through-hole 122. Likewise, the body end 315 may not descend to the support through-hole 122.

The sensing element 320 receives heat transferred from the external member to the body part 310. The sensing element 320 converts the received heat into an electrical signal and transfers the same to the electrically conducting part 200.

The sensing element 320 is coupled to the body part 310. Specifically, the sensing element 320 is partially inserted into the body hollow 312 formed inside the body part 310.

A portion of the sensing element 320 inserted into the hollow body 312 may be coupled to the body part 310 by a material such as epoxy. Therefore, the sensing element 320 does not randomly oscillate in the body hollow 312. In addition, heat transferred to the body part 310, specifically the base 314, may be transferred to the sensing element 320 while minimizing heat loss.

The sensing element 320 may be provided in any form which is capable of converting the transferred heat into an electrical signal and transmitting the same to the outside. In an exemplary embodiment, the sensing element 320 may be provided as a temperature sensor.

The sensing element 320 extends in a direction in which the body part 310 extends, which is the vertical direction in the illustrated exemplary embodiment. In this case, the sensing element 320 is formed to extend longer than the body part 310, and one end in the extension direction, which is the upper side end in the illustrated exemplary embodiment, may be exposed to the outside of the body hollow 312.

The upper side end of the sensing element 320 may be electrically connected to the electrically conducting part 200 to transmit the calculated electrical signal. In an exemplary embodiment, the upper end of the sensing element 320 and the electrically conducting part 200 may be in contact with each other to conduct electricity.

In the illustrated exemplary embodiment, the sensing element 320 includes a sensing body 321 and a sensing cable 322.

The sensing body 321 receives the heat transferred to the body part 310. The sensing body 321 calculates and converts the received heat into an electrical signal. Accordingly, the sensing body 321 may be defined as a temperature sensor.

The sensing body 321 is coupled to the body part 310. Specifically, the sensing body 321 is accommodated in the body hollow 312. The sensing body 321 may be fixedly coupled to the body part 310 by using epoxy or the like filled in the hollow body 312.

The sensing body 321 is positioned adjacent to base 314. In an exemplary embodiment, the sensing body 321 may be disposed to be in contact with the base 314. In the above exemplary embodiment, the sensing body 321 may receive most of the heat transferred to the base 314. Accordingly, the degree of distortion of the electrical signal calculated by the sensing body 321, that is, the temperature information, may be minimized.

In the illustrated exemplary embodiment, the sensing body 321 is a sphere shape. The sensing body 321 may be accommodated in the body hollow 312 and may have any shape which is capable of receiving heat transferred to the body part 310.

The sensing body 321 is coupled with the sensing cable 322. The sensing body 321 is electrically connected to the sensing cable 322.

The sensing cable 322 conducts electricity between the sensing body 321 and the electrically conducting part 200. In an exemplary embodiment, the sensing cable 322 may be coupled to the electrically conducting part 200 and conduct electricity as described above.

The sensing cable 322 is coupled to the sensing body 321. The sensing cable 322 extends from the sensing body 321 toward the electrically conducting part 200. In the illustrated exemplary embodiment, the sensing cable 322 extends vertically. The lower end of the sensing cable 322 is coupled to the sensing body 321 to conduct electricity. An upper side end of the sensing cable 322 is coupled to the electrically conducting part 200 to conduct electricity.

The sensing cable 322 may be provided in any form which is capable of conducting electricity with two or more connected members. In an exemplary embodiment, the sensing cable 322 may be provided as a conducting wire member.

The sensing cable 322 may be formed of a flexible material. Even when the body part 310 is lifted, the sensing cable 322 may remain energized with the electrically conducting part 200.

In the exemplary embodiment illustrated in FIG. 9, a portion of the sensing cable 322 is accommodated in the body hollow 312 for half of the extension length.

The remaining portion of the sensing cable 322 extends out of the body hollow 312. The remaining portion of the sensing cable 322 passes through the lifting space 124, the support through-hole 122 and the second space 121 in order and extends to the PCB 210 of the electrically conducting part 200. That is, the upper side end of the sensing cable 322 may be coupled to and conduct electricity with the PCB 210. The portion of the sensing cable 322 may be fixed by epoxy or the like filled in the hollow body 312.

The elastic member 330 presses the body part 310 to maintain a state in which the sensor module 300 is exposed to the outside of the housing 100. In addition, the elastic member 330 presses the body part 310 in contact with the external member to improve contact pressure.

The elastic member 330 is coupled to the body part 310. The elastic member 330 may apply a restoring force in a direction opposite to the housing 100, which is a direction toward the lower side in the illustrated exemplary embodiment, to the body part 310.

The elastic member 330 may be provided in any form which is capable of storing restoring force by shape deformation and transmitting the stored restoring force to other members. In the illustrated exemplary embodiment, the elastic member 330 has an elastic hollow 331 formed therein, and is provided in the form of a coil spring extending in a direction in which the body part 310 extends, that is, in the vertical direction.

In an exemplary embodiment in which the elastic member 330 is provided as a coil spring, one end of the extension direction of the elastic member 330, which is the upper side end in the illustrated exemplary embodiment, is elastically supported by the elastic member support 125 of the housing 100. Additionally, in the above exemplary embodiment, the other end of the extension direction of the elastic member 330, which is the lower side end in the illustrated exemplary embodiment, is elastically supported on the upper side surface of the base 314.

That is, the elastic member 330 extends between the elastic member support 125 and the base 314.

The elastic member 330 is accommodated in the second housing 120. Specifically, the elastic member 330 is accommodated in the lifting space 124 of the second housing 120.

When the body part 310 is lifted (i.e., moved toward the second housing 120), the elastic member 330 is compressed and stores restoring force. It will be understood that the restoring force is directed toward the body part 310 in a direction opposite to the second housing 120, that is, toward the lower side in the illustrated exemplary embodiment.

That is, the elastic member 330 presses the body part 310 in a direction of pushing the second housing 120 outward, in other words, in a direction toward the external member. Accordingly, contact pressure between the sensor module 300 and the external member may be increased. As a result, contact reliability between the sensor module 300 and the external member may be improved, and thus, the reliability of the sensed temperature information may also be improved.

In the illustrated exemplary embodiment, the elastic member 330 includes an elastic hollow 331.

The elastic hollow 331 is a space formed inside the elastic member 330. The elastic hollow 331 is formed through the extension direction of the elastic member 330, which is the vertical direction in the illustrated exemplary embodiment.

The body part 310 is inserted into and coupled to the elastic hollow 331. The elastic member 330 is compressed or stretched according to the lifting of the inserted body part 310, and may store and provide restoring force.

The elastic hollow 331 is formed to have a predetermined shape. In the illustrated exemplary embodiment, the elastic hollow 331 is formed to have a circular cross-section. In this case, the inner diameter (ds) of the elastic member, which is the inner diameter of the cross-section, may be greater than or equal to the first diameter (d1) of the body outer periphery 311, and less than the fourth diameter (d4) of the base 314.

Accordingly, the elastic hollow 331 accommodates the body outer periphery 311, but does not accommodate the base 314. As a result, the other end of the elastic member 330 may be stably supported by the base 314.

The detailed description of the shape deformation of the elastic member 330 and the direction of the applied restoring force according to the lifting of the body part 310 will be described below.

The fixed ring 340 is coupled to the body part 310 and limits the length of the sensor module 300 exposed to the outside of the second housing 120. That is, the fixed ring 340 is configured to limit the distance at which the body part 310 is moved outward by the elastic member 330.

The fixed ring 340 is coupled to the body part 310. Specifically, the fixed ring 340 is inserted into and coupled to the coupling groove 313 of the body part 310. In this case, corresponding to the position of the coupling groove 313, the fixed ring 340 is biased towards the body end 315, and is positioned to be spaced apart from the body end 315.

The fixed ring 340 is accommodated in the second space 121. Specifically, the fixed ring 340 is accommodated in the support depression 123 and is supported by the surface of the second housing 120 surrounding the support depression 123 from the lower side.

The fixed ring 340 is coupled to the body part 310 and may be provided in any shape which is capable of limiting the withdrawal length of the body part 310. In the illustrated exemplary embodiment, the fixed ring 340 is formed to include a hollow formed therein and an outer periphery partially surrounding the hollow. In other words, the fixed ring 340 has an annular shape with an opening formed on the outer periphery thereof.

In the illustrated exemplary embodiment, the fixed ring 340 includes a ring outer periphery 341 and a ring hollow 342.

The ring outer periphery 341 forms the outer side of the fixed ring 340. The ring outer periphery 341 is formed in a circular shape, and one side, which is the front side in the exemplary embodiment illustrated in FIG. 7, is formed to be open. Accordingly, the ring outer periphery 341 may be said to have an arc shape.

The ring outer periphery 341 may expand or contract in the radial direction. That is, after the ring outer periphery 341 is inserted into the coupling groove 313, when an external force in a radially inward direction is applied, the ring outer periphery 341 may be contracted in the radial direction. Accordingly, the fixed ring 340 may be firmly inserted and coupled to the coupling groove 313.

The ring outer periphery 341 is formed to partially surround the ring hollow 342.

The ring hollow 342 is a space formed inside the fixed ring 340. The body part 310 is inserted into and coupled to the ring hollow 342.

The ring hollow 342 may have any shape into which the body part 310 can be inserted. In the illustrated exemplary embodiment, the ring hollow 342 is formed to have a circular cross-section. In an exemplary embodiment in which the ring hollow 342 has a circular cross-section, the ring inner diameter (dr), which is the diameter of the ring hollow 342, may vary.

Specifically, before an external force directed radially inward is applied (i.e., before the fixed ring 340 is accommodated in the coupling groove 313), the ring inner diameter (dr) may be greater than or equal to the fifth diameter (d5) of the body end 315. Accordingly, the body end 351 may be inserted into the ring hollow 342 such that the fixed ring 340 may be moved toward the coupling groove 313.

When the fixed ring 340 reaches the coupling groove 313, an external force directed radially inward is applied such that the ring outer periphery 341 shrinks in the radial direction. Accordingly, the ring outer periphery 341 is inserted into and coupled to the coupling groove 313. In this state, the ring inner diameter (dr) becomes equal to the third diameter (d3) of the coupling groove 313.

In this case, the outer diameter of the ring outer periphery 341 is formed to be greater than the diameter of the support through-hole 122, but smaller than the diameter of the support depression 123. Accordingly, the fixed ring 340 is accommodated in the support depression 123 but does not enter the support through-hole 122.

Accordingly, the sensor module 300 may be drawn out of the second housing 120 only until the fixed ring 340 comes into contact with the lower surface of the second housing 120 surrounding the support depression 123 from the lower side.

As a result, the sensor module 300 is lifted while remaining coupled to the housing 100 such that contact pressure with the external member can be increased.

3. Description of the Operating Process of the Sensor Device 10 According to an Exemplary Embodiment of the Present Disclosure The sensor device 10 according to an exemplary embodiment of the present disclosure includes a sensor module 300 which is provided to be able to be lifted. The sensor module 300 includes an elastic member 330 which applies a restoring force in a direction toward the external member to be measured. The elastic member 330 presses the body part 310 toward the external member such that the contact pressure of the sensor module 300 is improved.

In addition, the sensor module 300 is provided with a fixed ring 340 which is coupled to the body part 310. The fixed ring 340 is lifted together with the body part 310 but is not drawn out. Accordingly, the sensor module 300 is drawn out only until the fixed ring 340 is supported by the inner surface of the second housing 120. As a result, the coupled state between the sensor module 300 and the housing 100 may be stably maintained.

Hereinafter, the operation process of the sensor device 10 according to an exemplary embodiment of the present disclosure will be described in detail with reference to FIGS. 10 and 11. In the illustrated exemplary embodiment, a rectangle indicated by a dotted-dashed line is illustrated to indicate the external member.

Figure 10:
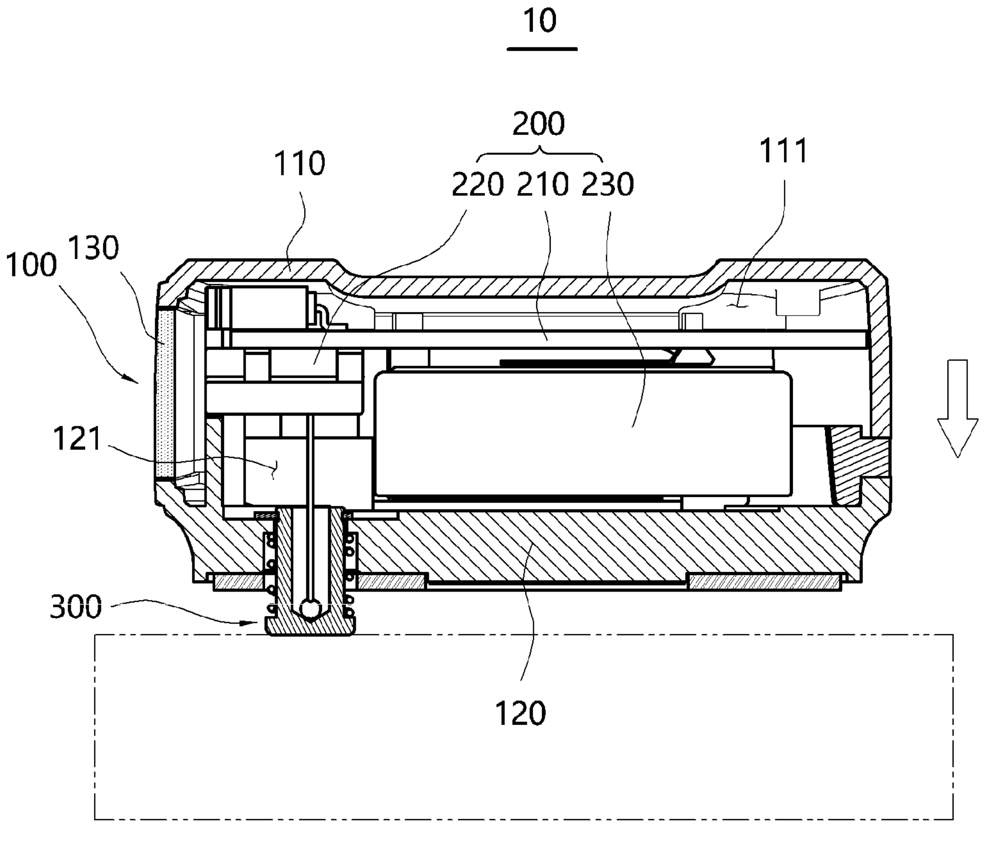
FIGS. 10 and 11 are A-A cross-sectional views illustrating the usage state of the sensor device of FIG. 1.

Referring to FIG. 10, a state in which the sensor device 10 is positioned adjacent to the external member is illustrated. In this state, the base 314 of the body part 310 is in contact with the external member, but no additional contact pressure is applied. Therefore, when the illustrated state is maintained, there is a possibility that the base 314 and the external member are spaced apart.

As such, an external force is applied to the sensor device 10 in a direction toward the external member, that is, in a direction directed downward in the illustrated exemplary embodiment (in a direction of the arrow on the right side of the sensor device 10).

Figure 11:
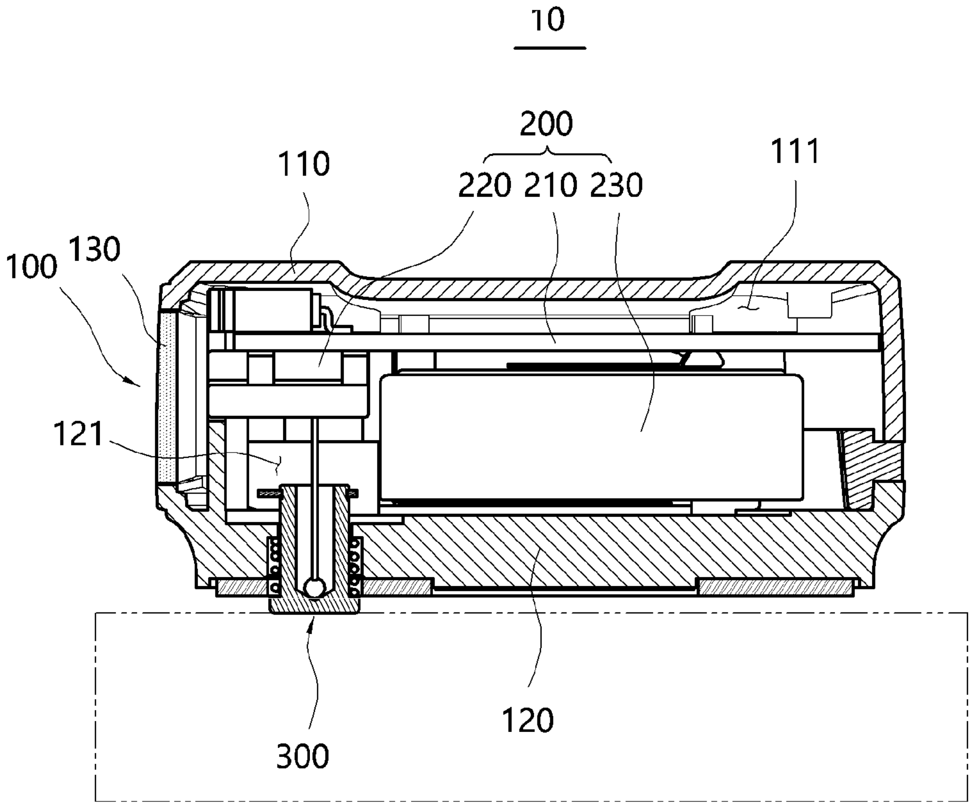

Referring to FIG. 11, a state in which the sensor device 10 is pressed toward the external member and the sensor module 300 is lifted into the second housing 120 is illustrated.

Although not illustrated, a band member (not illustrated) which is coupled to the external member surrounding the band connection 140 is coupled to penetrate through. A band member (not illustrated) presses the sensor device 10 and the external member in a direction toward each other to maintain a contact state between the sensor module 300 and the external member.

In the above state, the elastic member 330 is compressed in a state where both ends in the extension direction are supported by the elastic member support 125 and the base 314, respectively. Accordingly, the elastic member 330 applies a restoring force to the body part 310 in a direction to be stretched to the original length.

In this case, the support through-hole 122 is surrounded by the elastic member support 125 on the outer periphery thereof, and is formed to have a smaller diameter than the lifting space 124. The elastic member 330 accommodated in the lifting space 124 does not enter the support through-hole 122.

Accordingly, the restoring force applied by the elastic member 330 is applied in a direction that presses the base 314 outward, in a direction toward the lower side in the illustrated exemplary embodiment. As a result, the base 314 is pressed toward the external member, and contact pressure between the sensor module 300 and the external member may be increased.

Although the exemplary embodiments of the present disclosure have been described above, the spirit of the present disclosure is not limited to the exemplary embodiments presented in the present specification, and those skilled in the art who understand the spirit of the present disclosure may easily suggest other exemplary embodiments by changing, modifying, deleting or adding components within the scope of the same spirit, but this will also fall within the scope of the present disclosure.

| | |
|---|---|
| 10: Sensor device | 100: Housing |
| 110: First housing | 111: First space |
| 120: Second housing | 121: Second space |
| 122: Support through-hole | 123: Support depression |
| 124: Lifting space | 125: Elastic member support |
| 130: Connector cover | 140: Band connection |
| 200: Conducting portion | 210: PCB |
| 220: Connector | 230: Power unit |
| 300: Sensor module | 310: Body part |
| 311: Body outer periphery | 312: Body hollow |
| 313: Coupling groove | 314: Base |
| 315: Body end | 320: Sensing element |
| 321: Sensing body | 322: Sensing cable |
| 330: Elastic member | 331: Elastic hollow |
| 340: Fixed ring | 341: Ring outer periphery |
| 342: Ring hollow | dr: Ring inner diameter |
| ds: Elastic member inner diameter | d1: First diameter |
| d2: Second diameter | d3: Third diameter |
| d4: Fourth diameter | d5: Fifth diameter |

The invention claimed is:

1. A sensor device, comprising:

a housing within which a space is formed;

a sensor module which is movably coupled to the housing and is exposed at one end thereof to an outside and configured to sense information on a state of an external member; and an electrically conducting part which is accommodated in the space of the housing and is in electrical communication with the sensor module to receive detected information transferred from the sensor module and supply power to the sensor module therethrough, wherein the sensor module comprises:

a body part which is exposed to the outside; and an elastic member which is coupled to the body part and presses the body part toward the external member, and wherein the housing includes a band connection that provides communication between the space of the housing and an outside and to which a band member is coupled, wherein the band member is coupled with the external member by passing through the band connection and surrounding the external member so as to tie the housing to the external member, and wherein the body part is disposed such that one end thereof is in contact with the external member.

2. The sensor device of claim 1, wherein the body part comprises:

a body outer periphery which forms an outer periphery thereof and is formed to extend in a direction toward the housing and a direction toward the external member; and a base which is located at one end facing the external member among the ends of the body outer periphery and has a cross-section with a greater diameter than the cross-section of the body outer periphery.

3. The sensor device of claim 2, wherein inside the elastic member, an elastic hollow is formed into which the body outer periphery is inserted, and wherein the elastic member is formed to extend in a same direction as the body outer periphery, and one end in an extension direction elastically supports the base.

4. The sensor device of claim 2, wherein the housing comprises:

a lifting space which is formed to have a diameter greater than an outer diameter of the elastic member, extends in an extension direction around the body outer periphery, and has one end of the extension direction communicating with the outside; and a support through-hole which is formed to have a diameter greater than the outer diameter of the body outer periphery but smaller than the outer diameter of the elastic member, and is formed to extend in the extension direction of the body outer periphery such that one end of the extension direction communicates with the lifting space and an other end of the extension direction communicates with the space of the housing.

5. The sensor device of claim 4, wherein the housing comprises:

an elastic member support which surrounds the support through-hole radially from the outside and partially surrounds one end of the lifting space, wherein the other end of the extension direction of the elastic member elastically supports the elastic member support.

6. The sensor device of claim 1, wherein the body part comprises:

a body outer periphery which forms an outer periphery thereof and is formed to extend in a direction toward the housing and a direction toward the external member;

a coupling groove which is located to be biased toward one end in the direction toward the housing among ends of an extension direction of the body outer periphery, is formed to be recessed in the body outer periphery, and extends along an outer peripheral direction.

7. The sensor device of claim 6, wherein the sensor module comprises:

a fixed ring which is inserted into and coupled to the coupling groove and is configured to adjust a diameter thereof by being pressed in a radial direction, wherein the fixed ring is located in the space of the housing.

8. The sensor device of claim 7, wherein the housing comprises:

a support depression which is formed to be recessed on an inner surface in one direction facing the external member, into which the fixed ring is seated.

9. The sensor device of claim 1, wherein the sensor module comprises:

a sensing element which is accommodated in a body hollow formed inside the body part, detects the information, and conducts electricity with the electrically conducting part to transmit the detected information to the electrically conducting part.

10. The sensor device of claim 9, wherein the sensing element is configured to contact an inner surface of the body part and receive heat transferred from the external member to the body part.

11. The sensor device of claim 10, wherein inside the body hollow, a fixing material for fixing the sensing element to the body part is accommodated, and wherein the fixing material is formed of a thermally conductive material.

12. The sensor device of claim 11, wherein the fixing material is an epoxy material.

13. The sensor device of claim 1, wherein the electrically conducting part comprises:

a power supply unit which conducts electricity with the sensor module and supplies the power to the sensor module; and a printed circuit board (PCB) which conducts electricity with the power supply unit and the sensor module and receives the detected information.

14. The sensor device of claim 13, wherein the power supply unit is provided with a battery that is capable of charging and discharging.

* * * * *